H. S. MUNCH.
COMBINATION ICE TANK AND HYDRAULIC SCALE.
APPLICATION FILED JULY 29, 1912.

1,073,922.            Patented Sept. 23, 1913.

Witnesses
C. W. Pippy
C. E. Hunt

Inventor
H. S. Munch.

By H. B. Willson & Co.
Attorneys

UNITED STATES PATENT OFFICE.

HANS S. MUNCH, OF RACINE, WISCONSIN.

COMBINATION ICE-TANK AND HYDRAULIC SCALE.

1,073,922.  Specification of Letters Patent.  Patented Sept. 23, 1913.

Application filed July 29, 1912. Serial No. 712,154.

*To all whom it may concern:*

Be it known that I, HANS S. MUNCH, a citizen of the United States, residing at Racine, in the county of Racine and State of Wisconsin, have invented certain new and useful Improvements in Combination Ice-Tanks and Hydraulic Scales; and I do declare the following to be a full, clear, and exact description of the invention, such as will enable others skilled in the art to which it appertains to make and use the same.

This invention relates to improvements in combined ice tanks and hydraulic weighing scales.

One object of the invention is to provide means in combination with an ice tank whereby the specific gravity of the ice placed therein will be accurately indicated and the weight thus determined without the use of springs, weights or like mechanical devices.

Another object is to provide a device of this character which will be simple and inexpensive in construction and particularly adapted for use in connection with a refrigerator.

With these and other objects in view, the invention consists of certain novel features of construction, combination and arrangement of parts, as will be more fully described and claimed.

Figure 1:
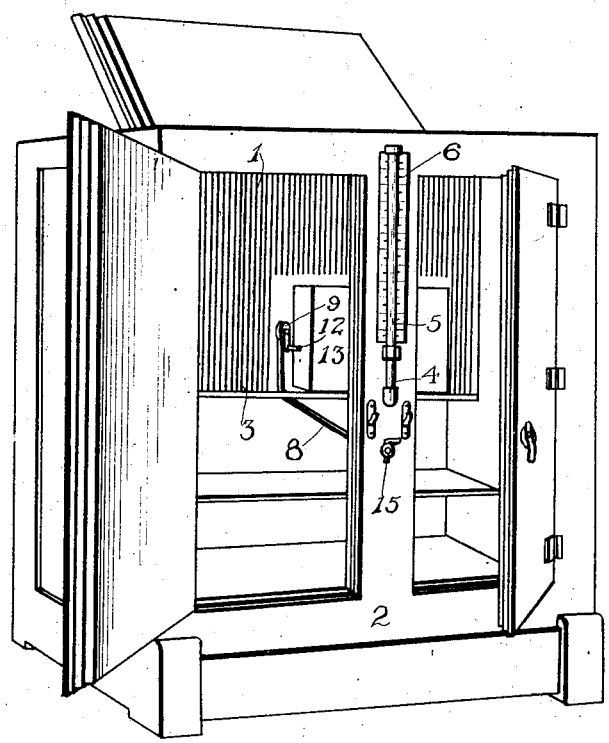
Figure 3:
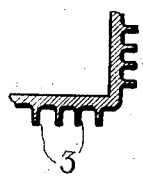
Figure 2:
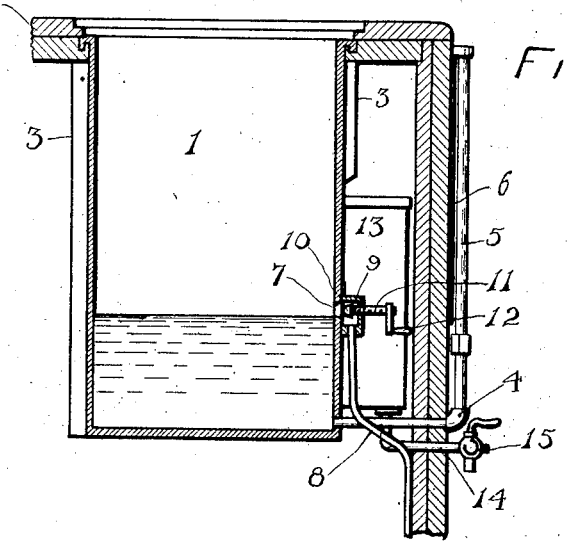

In the accompanying drawings:—Figure 1 is a perspective view of a refrigerator, showing my invention applied thereto; Fig. 2 is a vertical sectional view of the invention and a portion of the refrigerator; and Fig. 3 is a detail horizontal section of a portion of the ice tank forming part of the invention.

In the embodiment of the invention, I provide a tank 1 having certain predetermined square dimensions and which is here shown and is preferably adapted to be arranged in a refrigerator 2. The tank 1 is preferably provided on its outer sides with series of laterally projecting parallel ribs 3, and connected to one side of the same near the bottom thereof is a fluid conducting tube 4, which extends outwardly through the front side of the refrigerator and is turned upwardly and connected at its upper end with a glass gage tube 5 arranged on the outer side of the refrigerator, as shown. In connection with the gage tube 5 is employed a scale plate 6 having arranged thereon a suitable graduated scale of weight, the purpose of which will be hereinafter described.

In one side of the tank at a suitable distance above the bottom thereof is a fluid discharge opening 7, to which is connected a fluid discharging tube 8 having on its upper end a valve casing 9, in which is arranged a valve 10. The valve 10 is provided with a screw-threaded stem 11 having a threaded engagement with an aperture in the valve casing 9, and which is provided on its outer end with a crank-handle 12, whereby the valve may be shifted into and out of engagement with the opening 7 to close and open the latter. The first graduation or the beginning of the weighing scale of the tube 5 is arranged directly opposite and in line with the bottom or lower side of the opening 7, so that when fluid is placed in the tank 1 and reaches said opening, the fluid will seek its level in the fluid conducting tube 4 and the lower end of the gage tube, this level being at the lower graduation or beginning of the scale, as will be readily understood.

The tank 1 may be provided with and is here shown as having in connection with it a drinking water tank 13 secured to or formed integral with one side of the tank 1, whereby the ice in said tank 1 will cool the water in the tank 13. Connected with the lower end of the tank 13 is a discharge pipe 14, which extends through one side of the refrigerator and has secured thereon a faucet 15, whereby the water may be drawn from the tank 13 when desired.

In the operation of the device, water is placed in the tank 1 until the water reaches the level of and overflows through the opening 7, after which the valve 10 is operated to close said opening. The ice is now placed in the tank, whereupon the water will be displaced or caused to rise in the tank around the ice to a height corresponding with the weight or specific gravity of the latter. As the water is thus raised in the tank 1, said water will seek its level or rise to a corresponding height in the gage tube 5 and the height of the water will be indicated by the scale 6, thus accurately determining the weight of the piece of ice placed in the tank. After the weight of the ice has been thus indicated, the valve 10 may be opened if desired and the greater part of the water drained from the tank.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

1. A tank having therein at a suitable elevation above the bottom thereof a discharge opening, a discharge tube connected with said opening, a valve casing on said tube, a valve arranged in said casing and adapted to be operated to close said opening, a fluid conducting pipe connected with the tank at the bottom thereof, and a gage tube connected with said fluid conducting pipe and having in connection therewith a scale of weight whereby the fluid displaced or raised in the tank by the specific gravity of a body placed therein, will also rise in said tube and the specific gravity or weight of the body placed in the tank thus indicated on the scale.

2. In a refrigerator, an ice tank having therein at a suitable elevation above the bottom thereof a fluid discharging opening, laterally-projecting ribs formed on the outer side of said tank, a discharge tube connected with said opening, a valve casing arranged on said tube over said opening, a valve in said casing to open and close said opening, a threaded stem on said valve having a threaded engagement with said casing, a crank handle on said stem, whereby the latter is actuated to open and close the valve, a fluid conducting pipe with the tank at the bottom thereof, and a glass gage tube connected with said fluid conducting tube and extending upwardly on the outer side of the refrigerator to the height of said tank, said tube having in connection therewith a scale of weight beginning at a point on a level with the opening in the tank, whereby when said valve is closed and a piece of ice placed in the tank the fluid therein will be displaced or raised to a height corresponding with the weight of the ice, said fluid rising in said gage tube to a corresponding height, thereby indicating on the scale of measurement the weight or specific gravity of the ice.

In testimony whereof I have hereunto set my hand in presence of two subscribing witnesses.

HANS S. MUNCH.

Witnesses:
PAUL W. PETERSEN,
MYRA W. HERMES.